United States Patent
Aggarwal et al.

(10) Patent No.: US 8,660,983 B2
(45) Date of Patent: Feb. 25, 2014

(54) SYSTEM AND METHOD FOR IMPROVING OUTCOMES IN ENTERPRISE LEVEL PROCESSES

(75) Inventors: Amit Aggarwal, Gurgaon (IN); Ruchin Chandra, Gurgaon (IN); Apoorva Aggarwal, Gurgaon (IN); Parul Ranvir Singh, Gurgaon (IN); Guni Brar, Gurgaon (IN)

(73) Assignee: Genpact (IN)

( * ) Notice: Subject to any disclaimer, the term of this patent is extended or adjusted under 35 U.S.C. 154(b) by 0 days.

(21) Appl. No.: 12/915,568

(22) Filed: Oct. 29, 2010

(65) Prior Publication Data
US 2011/0238616 A1  Sep. 29, 2011

(30) Foreign Application Priority Data
Dec. 4, 2009  (IN) .......................... 2511/DEL/2009

(51) Int. Cl.
*G06F 17/30*  (2006.01)

(52) U.S. Cl.
USPC .............................. 707/602; 707/770; 705/35

(58) Field of Classification Search
USPC .................................. 707/602, 999.005, 770
See application file for complete search history.

(56) References Cited

U.S. PATENT DOCUMENTS

| | | | |
|---|---|---|---|
| 7,007,029 B1 * | 2/2006 | Chen .......................... | 707/999.1 |
| 2002/0069143 A1 * | 6/2002 | Cepeda ........................... | 705/30 |
| 2005/0091654 A1 * | 4/2005 | Lection et al. ................ | 718/100 |
| 2008/0208667 A1 * | 8/2008 | Lymbery et al. ............. | 705/7.26 |

* cited by examiner

*Primary Examiner* — Monica Pyo
(74) *Attorney, Agent, or Firm* — Katten Muchin Rosenman LLP

(57) ABSTRACT

A method and system for using a data warehouse to improve results of enterprise level processes are provided. The data warehouse typically includes industry-wide empirical data relating to corresponding operational practices, metrics, and outcomes. The method focuses on actual process results by taking a holistic, end-to-end view of the process in conjunction with using the data in the data warehouse to enable effective process improvements.

13 Claims, 2 Drawing Sheets

SYSTEM AND METHOD FOR IMPROVING OUTCOMES IN ENTERPRISE LEVEL PROCESSES

This application claims foreign priority benefits under 35 U.S.C. 119(a)-(d) or (f) of India Patent Appln. No. 2511/DEL/2009, filed Dec. 4, 2009, the contents of which is incorporated herein by reference

BACKGROUND OF THE INVENTION

1. Field of the Invention

The present invention relates to the field of business process outsourcing (BPO). More particularly, the invention relates to using data warehouses to improve outcomes in enterprise level processes.

2. Related Art

Large enterprises, such as corporate entities and governmental agencies, are typically interested in finding ways to improve efficiencies and reduce waste in their respective business processes. Due to the economies of scale, a relatively minor process improvement may make a large difference in the revenue stream and/or profitability yielded by the process. In many instances, this approach entails efforts to gain efficiency in the process, or in some portion of the process. However, such an approach often fails to cause corresponding improvements in the overall outcome of the process. In this manner, such apparent efficiency gains may be suboptimal or even illusory.

In many instances, organization and supply chain silos often restrict the end-to-end view of business processes, thus causing value leakage at the interfaces. In addition, many companies have an insufficient understanding of the interlinkages between granular process metrics and business outcomes. Hence, they may be unclear about which levers influence which business outcomes, and by how much. Further, many enterprises have limited access to granular benchmarks, thereby depriving decision makers of standards against which to measure process performance and disabling them from setting appropriate targets. Over-reliance on the technology lever often results in unrealized value from process rigor and analytics.

Recently, with increases in computer storage capacities and processing speeds, data warehousing has become more common as a means of storing and utilizing large amounts of data. Accordingly, there has been much study regarding how to effectively exploit such large volumes of data. In particular, there is an open question as to how to use data warehouses to improve enterprise level process outcomes. Accordingly, the present invention is intended to address this question.

SUMMARY OF THE INVENTION

In one aspect, the invention provides a system for improving a first result of a first process. The system comprises a computer server; a data warehouse containing a plurality of databases, the data warehouse being accessible via the server; and an interface in communication with the server. The plurality of databases includes at least a first database that contains data relating to a first performance measure relating to the first process, a second database that contains data relating to a first operational subprocess performed as a part of the first process, and a third database that contains data relating to the first result of the first process. When a user has collected benchmark data relating to the first performance measure and metric data relating to the first operational subprocess and result data relating to the first result, the interface is configured to enable the user to extract data from any of the plurality of databases, thereby enabling the user to compare the extracted data to the collected data and to use a result of the comparing to determine a strategy for improving the first result of the first process.

The first database may include empirical data corresponding to performance measures relating to processes that are substantially similar to the first process and are executed by one or more of a plurality of entities. The second database may include empirical data corresponding to metrics relating to subprocesses that are substantially similar to the at least one operational subprocesses and are executed by one or more of a plurality of entities. The third database may include empirical data corresponding to results of processes that are substantially similar to the first process and are executed by one or more of a plurality of entities.

The first performance measure may be selected from the group consisting of an average cost of executing an operational subprocess, an average time spent in executing an operational subprocess, and an average cost paid to a supplier or subcontractor. The first operational subprocess may be selected from the group consisting of a process executed by a supplier or subcontractor, a report generation, a procurement of materials, and a payment process. The first result may be selected from the group consisting of an average cost of executing the first process, an average profit realized from executing the first process, an average time spent in executing the first process, and a rate of successful completion of the first process.

In another aspect, the invention provides a method for using a data warehouse to improve a first result of a first process. The data warehouse contains at least a first database, a second database, and a third database. The method comprises the steps of: identifying at least one performance measure relating to the first process; identifying at least one operational subprocess performed as a part of the first process; identifying the first result; collecting benchmark data relating to the at least one performance measure; collecting metric data relating to the at least one operational subprocess; collecting result data relating to the first result of the first process; comparing the collected benchmark data to data contained in the first database; comparing the collected metric data to data contained in the second database; comparing the collected result data to data contained in the third database; and using at least one result of any of the comparing steps to determine a strategy for improving the first result of the first process.

The first database may include empirical data corresponding to performance measures relating to processes that are substantially similar to the first process and are executed by one or more of a plurality of entities. The second database may include empirical data corresponding to metrics relating to subprocesses that are substantially similar to the at least one operational subprocesses and are executed by one or more of a plurality of entities. The third database may include empirical data corresponding to results of processes that are substantially similar to the first process and are executed by one or more of a plurality of entities.

The at least one performance measure may be selected from the group consisting of an average cost of executing an operational subprocess, an average time spent in executing an operational subprocess, and an average cost paid to a supplier or subcontractor. The at least one operational subprocess may be selected from the group consisting of a process executed by a supplier or subcontractor, a report generation, a procurement of materials, and a payment process. The first result may be selected from the group consisting of an average cost of executing the first process, an average profit realized from executing the first process, an average time spent in executing the first process, and a rate of successful completion of the first process.

DETAILED DESCRIPTION OF THE INVENTION

The present invention addresses the question of how to improve enterprise level process outcomes by focusing on the actual result of each individual process and taking a holistic, end-to-end view of the entire process. In addition, the present invention exploits industry-wide empirical data relating to key performance measures and drivers and operating practices, in addition to empirical data corresponding to the process outcomes, to inform insights that lead to effective process improvements.

The methodology of the present invention establishes a road map for impacting business outcomes through a unique combination of insights, best practices, metrics, and diagnostic ability. The methodology entails a granular and actionable end-to-end view that establishes linkages between outcomes, measures, and drivers backed by proprietary databases of granular-level benchmarks, metrics and operating practices to help unlock deep insights into the drivers of the performance variation. The approach can be summarized as Define-Build-Analyze-Solve-Refine (DBASR™). DBASR™ is a registered trademark of Genpact Ltd. This approach involve cross-functional and domain expertise to build upon a go-to-market solution for a client The DBASR approach enables a high-risk/high-return model that represents a better ultimate outcome for the client.

The DBASR approach involves comprehensively defining a process, both in terms of adequate width from an enterprise perspective, and adequate depth for addressing the most important business outcomes to the client. Key linkages between those business outcomes and key process performance measures and drivers are established. Cross-industry benchmarks are used to diagnose the opportunity, define the performance targets, and ultimately measure results.

Figure 1:
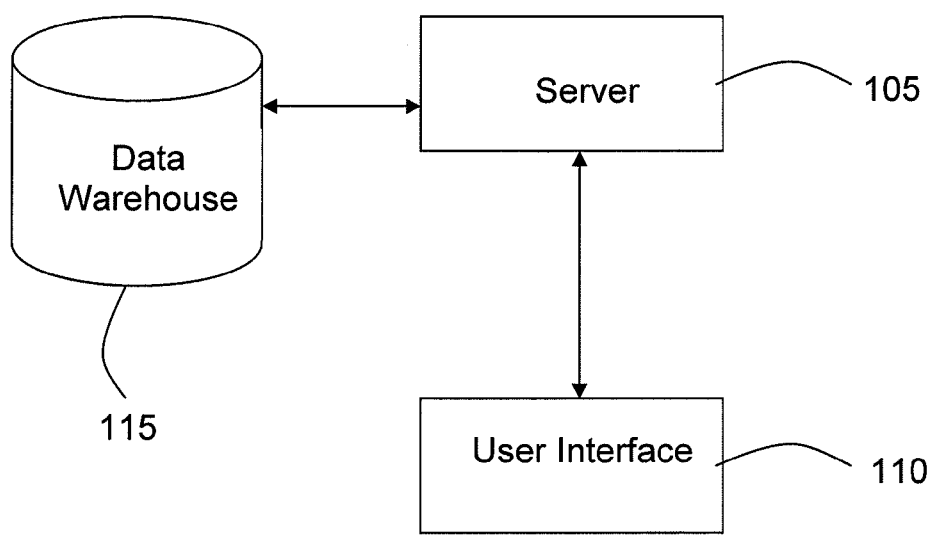
FIG. 1 illustrates a block diagram of a system for using a data warehouse to improve a result of a process according to a preferred embodiment of the invention.

Referring to FIG. 1, a block diagram illustrates a system 100 for improving enterprise level process outcomes according to a preferred embodiment of the present invention. The system includes one or more computer servers 105, one or more user interfaces 110, and a data warehouse 115. The server 105 is preferably implemented by the use of one or more general purpose computers, such as, for example, a Sun Microsystems F15k. Each user interface 110 is also preferably implemented by the use of one or more general purpose computers, such as, for example, a typical personal computer manufactured by Dell, Gateway, or Hewlett-Packard. Each of the server 105 and the user interface 110 can include a microprocessor. The microprocessor can be any type of processor, such as, for example, any type of general purpose microprocessor or microcontroller, a digital signal processing (DSP) processor, an application-specific integrated circuit (ASIC), a programmable read-only memory (PROM), or any combination thereof. The trading host may use its microprocessor to read a computer-readable medium containing software that includes instructions for carrying out one or more of the functions of the server 105, as further described below.

Each of the server 105, the user interface 110, and the data warehouse 115 can also include computer memory, such as, for example, random-access memory (RAM). However, the computer memory of each of the server 105, the user interface 110, and the data warehouse 115 can be any type of computer memory or any other type of electronic storage medium that is located either internally or externally to the server 105 or the user interface 110, such as, for example, read-only memory (ROM), compact disc read-only memory (CDROM), electro-optical memory, magneto-optical memory, an erasable programmable read-only memory (EPROM), an electrically-erasable programmable read-only memory (EEPROM), or the like. According to exemplary embodiments, the respective RAM can contain, for example, the operating program for either the server 105 or the user interface 110. As will be appreciated based on the following description, the RAM can, for example, be programmed using conventional techniques known to those having ordinary skill in the art of computer programming. The actual source code or object code for carrying out the steps of, for example, a computer program can be stored in the RAM.

Each of the server 105 and the user interface 110 can also include a database. Further, the data warehouse 115 includes a plurality of databases. Each database can be any type of computer database for storing, maintaining, and allowing access to electronic information stored therein. The server 105 preferably resides on a network, such as a local area network (LAN), a wide area network (WAN), or the Internet. The user interface 110 preferably is connected to the network on which the host server resides, thus enabling electronic communications between the server 105 and the user interface 110 over a communications connection, whether locally or remotely, such as, for example, an Ethernet connection, an RS-232 connection, or the like.

Figure 2:
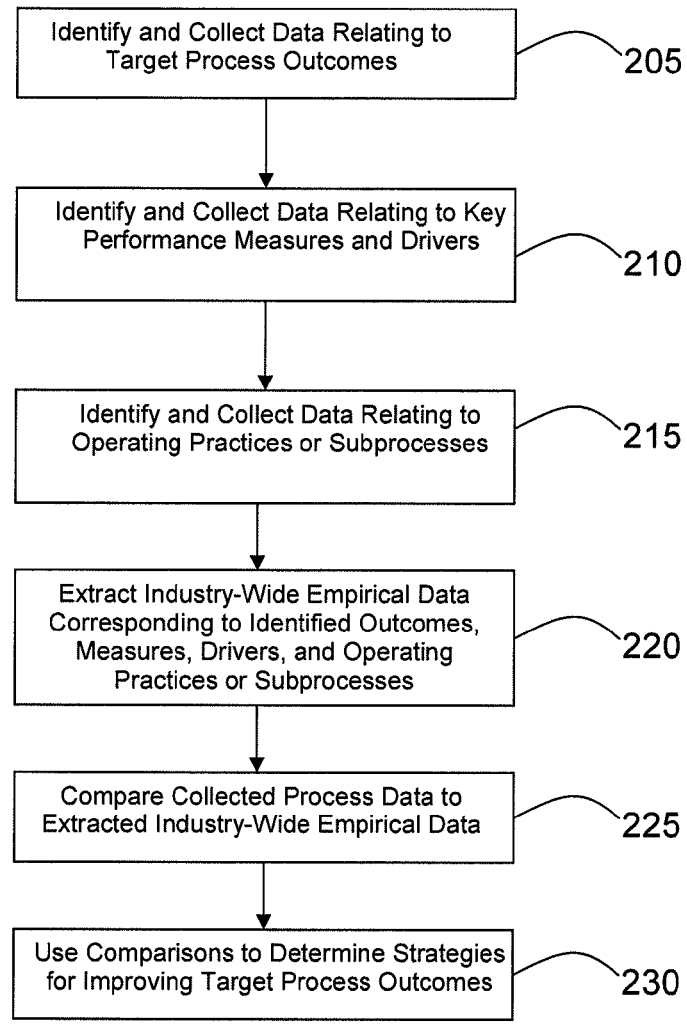
FIG. 2 is a flow chart that illustrates a method for using a data warehouse to improve a result of a process according to a preferred embodiment of the invention.

Referring to FIG. 2, a flow chart that illustrates a method for using a data warehouse to improve process outcomes for a given enterprise level process according to a preferred embodiment of the invention is shown. In the first step 205, a particular process result is identified, and data relating to the identified result is collected. This identification of a particular process result is important in that an improvement of this result becomes the focus of the endeavor enabled by the present invention. The collection of process data relating to the identified result provides a user with a way of knowing whether improvements have been achieved and of quantifying any such improvements.

In the second step 210, key performance measures and performance drivers for the process are identified, and data relating to the identified measures and drivers are collected. Typically, a user can observe the steps of the process to determine which parameters quality as key performance measures and key performance drivers. The collection of process data relating to the identified measures and drivers provides the user with quantifiable information for use in determining and measuring improvements in these aspects.

In the third step 215, operating practices or subprocesses are identified, and data relating to the identified operating practices are collected. Through observation, the user is generally able to identify the critical practices that are most likely to have an impact on the ultimate outcome of the overall process. The collection of process data relating to the identified operating practices or subprocesses provides the user with quantifiable information for use in determining and measuring improvements in these practices.

In the fourth step 220, industry-wide empirical data relating to each of the three classes of collected data are extracted. In a preferred embodiment, the data may be extracted from a database contained within the data warehouse 115. Preferably, the data warehouse 115 contains a plurality of databases, and each database contains a class of data that has been gathered from similar enterprises in the industry and similar process types used in the same industry. Preferably, the data warehouse 115 also contains cross-industry data. For example, accounting processes, such as processes relating to accounts payables, receivables, and collections, may have similar aspects across multiple industries, and the data warehouse 115 may have data relating to these aspects.

In the fifth step 225, the collected data are compared with the extracted empirical data in each of the three aspects. By making these comparisons, the user is able to determine whether the performance of the process aspect being compared meets or exceeds that which may generally be expected in the industry. In this manner, the user can pinpoint which aspects may be able to, be improved. Further, the comparisons may yield information relating to the magnitude of the difference between the process performance and the average industry-wide performance, or in which percentile of a statistical spread the collected data fall. For example, a given performance aspect may correspond to industry-wide data that roughly follows a normal, bell-shaped curve, and the aspect being evaluated may fall at the $60^{th}$ percentile of that curve. Thus, the user can determine that, although the aspect is already performing better than 60% of the industry, there is still room for reasonable improvement, and the extracted data also provide a guideline as to the magnitude of such an improvement.

Finally, in step 230, the user is able to use the comparisons to determine strategies for improving the desired process outcome. In this manner, the user can focus on the actual final outcome of the process, while making use of extensive data that pertains both to that outcome itself as well as to any one of a number of identified performance measures, drivers, and operating practices. Thus, the user has a full range of information that will enable the user to determine which steps are most likely to have a real impact on the final result of the process.

Example case studies that have made use of a method according to a preferred embodiment of the present invention are hereby presented: In a first exemplary case study, a retail bank was interested in increasing the size of its short-term loan portfolio. A key factor in winning customers in the unsecured personal loans market is being able to process applications quickly. Therefore, in order to establish why this activity was not functioning as speedily as it could, users of the present invention collaborated with bank personnel to map the as-is flows in all of the steps that were directly and indirectly involved in the loan approval process.

Through the use of industry data relating to the loan approval process and the constituent steps of that process, the team discovered that the primary reason for the previous relatively long turnaround time was that loan applicants often failed to provide sufficient information to enable the application to be processed promptly. This resulted in a high percentage of requests being delayed for too long, which led to customers taking their business to rival banks before further data could be sought. Other identified problems included a time lag in acknowledging that applications had been received, and incorrect input of application information by bank staff, which, in turn, caused multiple calls to customers to rectify errors.

The DBASR methodology was used to pinpoint these particular shortfalls in the previous process. This led to a redesign of numerous call and verification processes, and the establishment of a dedicated support team to follow up on loan requests in order to strengthen the bank's operational rigor. This led to major improvements in customer service, as each applicant now receives a loan acknowledgement within two hours of submitting their claim as well as a telephone call within 24 hours to harvest any missing information. As a result of these strategies, the size of the bank's short-term loan portfolio was increased by approximately 74 million euros. In this manner, the DBASR methodology led directly to a major improvement in the overall process outcome.

In a second case study, a leading insurance company was interested in optimizing its settlement processes. The project focused on revamping the accounts-payable and receivables process life cycle between insurer and broker to ensure the timely settlement of transactions. This activity included evaluating end-to-end process from claims booking and reconciliation to funds allocation and collection.

Through the use of industry-wide data relating to insurance settlement processes, the DBASR methodology enabled a standardization, streamlining, and automation of the insurance company's collections process flow. The process efficiency improved by ensuring that more frequent statements are provided to brokers. In addition, a new measurement and reporting system enables company personnel to explore and analyze the root causes of any unreconciled allocations on a monthly basis. The implementation of a new graphics-based interface enables those personnel to detect and react quickly to other issues. These moves have led to an improvement in the company's booking accuracy of approximately 15%. In addition, the improved processes have yielded an increase in cash flow of approximately 30 million euros, and also an increase in controllership impact of approximately 30 million euros.

An advantage provided by the present invention is that by focusing on the end-to-end process rather than focusing on process efficiency, greater improvements in overall process outcome may be achieved. For example, integrating account payables (AP) processes with procurements can help reduce working capital requirements and expenditures. Controlling non-purchase order spending through a policy of not paying in the absence of a purchase order and reducing the cycle time for requisition approval can result in savings. Differences between contract terms and purchase order terms for payment can result in cash leakage through duplicate payments. Increasing sourcing leverage through on-time payment and facilitating discount capture by reducing delays can result in spending reductions. Repeating execution of tight sourcing processes and practices such as updating of blanket agreements and compressing time to upload contracts typically result in overall savings. Maverick spending can be avoided through ensuring process compliance by suppliers and subcontractors. Increasing visibility of addressable spending typically increases compliance.

Using an example of an outsourcing situation that involves the employment of suppliers and/or subcontractors, typical causes of suboptimal process outcomes include: reduction in the total cost of ownership (TCO); working capital reduction; availability of material; costs of processing; and cycle times of processing. In this example, an enterprise level process can be viewed as including sourcing subprocesses, procurement subprocesses, and payment subprocesses. Sourcing may comprise a spending analysis, including extracting, cleansing, and analyzing spending, and a key performance measure may be a percentage of visible and accurate spending. Spending analysis activities may include extracting and categorizing spending data and generating reports. Key performance drivers may include a percentage of spending that is accurately categorized and a number of reports used. Implementable operating practices may include automated categorization and a weekly reporting of expenditures.

A second component of sourcing may be a category strategy of defining a vendor base and targeting cost reductions. Key performance measures may include a percentage of spending controlled by purchasing and a percentage of suppliers for 80% of spending, or any predetermined percentage of overall spending. Activities may include assessing the supplier market and profiling the suppliers; defining a procurement spread among the suppliers; and generating one-time TCO reduction ideas. Key performance drivers may include an accuracy of the supply assessment; the number of suppliers per unit spending; and the percentage of TCO reduction ideas generated. Implementable operating practices may include a financial analysis of each potential supplier; a periodic supplier review; and regular, periodic TCO reduction idea generation sessions.

A third component of sourcing may be negotiation and contracting. Key performance measures may include a percentage of price reduction in a contract and an average number of account payable days. Activities may include floating an electronic auction or Requests for Qualifications (RFQs) for potential vendors; actual negotiation and closing of a contract; and management of vendor performance. Key performance drivers may include a percentage of spending that is the subject of RFQs or that is e-auctioned; the percentage of spending that is under contract; the percentage of vendors that have provided discount contract terms; the percentage of vendors on a balance scorecard; and year-over-year reduction offered by vendors. Implementable operating practices may include a 100% RFQ or e-auction practice; obtaining value for each negotiation lever; and identifying suppliers that are worthy of long-term investment.

Procurement may include a planning and purchase order issue and material receipt and inventory update. Key performance measures may include a percentage of spending for preferred vendors, a requirement to purchase order turn-around time, a percentage of inaccurate purchase orders, and a number of out-of-stock situations.

Payment may include processing and releasing payment for accounts payable. Key performance measures may include whether a discount is available and whether the discount has been availed; the cost and cycle time of payment processing; and the accuracy of payment. Payment activities may include receiving invoices; processing invoices; performance of three-way match and resolution; making of payments and capturing of discounts; providing information and managing a help desk; and payment analytics and compliance reporting. Key performance drivers may include: invoice date to receipt turn-around time; the cost of invoice receipt; the accuracy of invoice capture; the cost and cycle time of invoice processing; a first pass yield on invoice match and resolution; a percentage of invoices that are incorrectly matched; a cycle time for resolution of incorrectly matched invoices; a percentage spending on non-purchase order materials; a percentage of discount capture; a paid-on-time performance; a percentage of invoices that are overpaid; accuracy and cycle time of issue resolution; a percentage of vendors without payment terms; and a percentage of vendors without discount terms. Implementable operating practices for payment activities may include the following: Updated mailing address; automation via e-billing, smart imaging, and/or e-invoicing; optimized invoice checking; invoice coding with error reduction audit and verification; automation between accounts payable and procurement fore resolution; exceptions escalation; duplicate prevention and optical character recognition tools; workflow to not allow direct/non-purchase-order purchases; escalation guidelines to associates; toolkits for standard operating procedure and issue resolution; and integrated spending visibility tools across procurement and accounts payable.

A "collection to closure" enterprise is another type of enterprise that would benefit from using the methods and systems of the present invention. A primary outcome of the collections process may be the overall number of dollars collected; therefore, a method according to a preferred embodiment of the present invention may be used effectively by viewing the end-to-end collections process with a focus on this particular process outcome. Collection to closure enterprises typically may assess a gross loss, a cost to collect, customer satisfaction, compliance, and a recovery rate. A first subprocess of a collection enterprise may comprise receiving and applying payments. Key performance measures may include cycle time, first pass yield, and a number of failed electronic payments. A second subprocess may comprise a design collection strategy. Key performance measures may include a total amount outstanding, a percentage of collection effectiveness, and a number of delinquencies that are at least 30-day, 60-day, 90-day, and/or any other predetermined number of days delinquent.

A third subprocess may comprise early stage collections, and fourth subprocess may comprise late stage collections. For both of these subprocesses, a key performance measure is collection efficiency, which may be defined as a ratio between the cost of collection and an amount collected. These subprocesses may comprise several activities, including the following: determining staffing; receiving downloads; creating strategies and/or campaigns for collections; login by agents; dial accounts; monitoring of performance; efforts to contact debtors; efforts to collect from debtors; and updating of accounts. Key performance drivers may include the following: staffing variance percentage; percentage of staff idle time; workload completion percentage; penetration rate percentage; percentage completion rate for creation of strategy or campaign; regarding agent login, percentage of time on system and percentage of schedule adherence; regarding dial accounts, number of prime time attempts and number of dials per hour; real time availability of metrics for performance monitoring; whether the correct party is being contacted for a given collection; whether a promise to pay has been obtained; and whether such a promise has been kept. Implementable operating practices may include: a forecasting model for staffing; staff roster controls; hourly download reports; rosters week in advance; penetration and optimization of strategies and campaigns; education of agents; tracking of daily delivery by agents; checking dialer attributes; devising strategies for best times to call; optimizing filter criteria; publishing reports; skill-based routing of contacting debtors; analysis of best time to call; aligning incentives for obtaining and keeping promises to pay; and refresher training.

A fifth subprocess may comprise specialized collections. Key performance measure may include delinquency movement metrics, 30+ inventory in skip, and LE percentage. A sixth subprocess may comprise recoveries. Key performance measures may include liquidation and/or spin rate; number of dollars collected; rank against competing collection agencies; and revenue rates. A seventh subprocess may include account closure. Key performance measures may include write-off rate; provisions for account closure; net flow by due stage; and cancellation rate.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for improving a first result of a first target process, the system comprising:
    a computer server;
    a data warehouse containing a plurality of databases, the data warehouse being accessible via the server; and
    an interface in communication with the server,
    wherein the plurality of databases includes at least (i) a first database that contains industry-wide empirical data relating to a first performance measure relating to the first target process, (ii) a second database that contains industry-wide empirical data relating to a first operational subprocess performed as a part of the first target process, and (iii) a third database that contains industry-wide empirical data relating to the first result of the first target process, wherein the third database includes empirical data corresponding to results of processes that substantially correspond to the first target process and are executed by one or more of a plurality of business entities; and
    wherein, when a user has identified and collected (i) benchmark data relating to the first performance measure and (ii) metric data relating to the first operational subprocess and (iii) result data relating to the first result, the interface is configured to enable the user to extract the industry-wide empirical data from any of the plurality of databases, thereby enabling the user to compare the extracted industry-wide empirical data to the identified and collected (i) benchmark data, (ii) metric data, and (iii) result data; and to use a result of the comparing to determine a strategy for improving the first result of the first target process.

2. The system of claim 1, wherein the first database includes empirical data corresponding to performance measures relating to processes that substantially correspond to the first target process and are executed by one or more of a plurality of business entities.

3. The system of claim 1, wherein the second database includes empirical data corresponding to metrics relating to subprocesses that substantially correspond to the at least one operational subprocesses and are executed by one or more of a plurality of business entities.

4. The system of claim 1, wherein the first performance measure is selected from the group consisting of an average cost of executing an operational subprocess, a best-in-class cost of executing the operational subprocess, an average time spent in executing the operational subprocess, a best-in-class time spent in executing the operational subprocess, and an average invoice amount paid to a supplier or subcontractor.

5. The system of claim 1, wherein the first operational subprocess is selected from the group consisting of a process executed by a supplier or subcontractor, a report generation, a procurement of materials, and a payment process.

6. The system of claim 1, wherein the first result is selected from the group consisting of an average cost of executing the first process, an average profit realized from executing the first process, an average time spent in executing the first process, and a rate of successful completion of the first process.

7. A method of using a data warehouse to improve a first result of a first target process, the method comprising the steps of:
    providing the data warehouse with at least (i) a first database storing benchmark data comprising empirical data from a plurality of prior processes, (ii) a second database storing metric data comprising empirical data from a plurality of prior processes, and (iii) a third database storing result data comprising empirical data from a plurality of prior processes:
    identifying at least one performance measure relating to the first target process;
    identifying at least one operational subprocess performed as a part of the first target process;
    identifying the first result of the first target process;
    collecting benchmark data relating to the at least one performance measure;
    collecting metric data relating to the at least one operational subprocess;
    collecting result data relating to the first result of the first process;
    extracting from the data warehouse industry-wide empirical data that correspond to (i) process outcomes, (ii) key performance measures and drivers, and (iii) operating practices or subprocesses, of empirical processes that correspond to the target process;
    comparing the collected benchmark data to the empirical benchmark data contained in the first database;
    comparing the collected metric data to the empirical metric data contained in the second database;
    comparing the collected result data to the empirical result data contained in the third database, the third database includes empirical data corresponding to results of processes that substantially correspond to the first target process and are executed by one or more of a plurality of business entities; and
    using at least one result of any of the comparing steps to determine a strategy for improving the first result of the first target process.

8. The method of claim 7, wherein the first database includes empirical data corresponding to performance measures relating to processes that substantially correspond to the first target process and are executed by one or more of a plurality of business entities.

9. The method of claim 7, wherein the second database includes empirical data corresponding to metrics relating to subprocesses that substantially correspond to the at least one operational subprocesses of the first target process and are executed by one or more of a plurality of business entities.

10. The method of claim 7, wherein the at least one performance measure is selected from the group consisting of an average cost of executing an operational subprocess, an average time spent in executing an operational subprocess, and an average cost paid to a supplier or subcontractor.

11. The method of claim 7, wherein the at least one operational subprocess is selected from the group consisting of a process executed by a supplier or subcontractor, a report generation, a procurement of materials, and a payment process.

12. The method of claim 7, wherein the first result is selected from the group consisting of an average cost of executing the first process, an average profit realized from executing the first process, an average time spent in executing the first process, and a rate of successful completion of the first process.

13. A system for improving a first result of a first target process, the system comprising:
- a computer server; and
- a data warehouse containing a plurality of databases, wherein the plurality of database includes at least (i) a first database that contains industry-wide empirical data relating to a first performance measure relating to the first target process, (ii) a second database that contains industry-wide empirical data relating to a first operational subprocess performed as a part of the first target process, and (iii) a third database that contains industry-wide empirical data relating to the first result of the first target process, wherein the third database includes empirical data corresponding to results of processes that substantially correspond to the first target process and are executed by one or more of a plurality of business entities, the data warehouse being accessible via the server;
- the computer server being configured for a user to (i) identify and collect result data corresponding to the target process outcome, (ii) identify and collect benchmark data corresponding to key performance measures and drivers corresponding to the first target process, and (iii) identify and collect metric data corresponding to operating practices or subprocesses corresponding to the first target process;
- the computer server being configured for the user to extract from the data warehouse industry-wide empirical data that correspond to (i) process outcomes, (ii) key performance measures and drivers, and (iii) operating practices or subprocesses, of empirical processes that correspond to the target process;
- the computer server being configured for the user to compare (i) the identified and collected data corresponding to the target process outcome with the extracted empirical processes outcomes, (ii) the identified and collected data corresponding to key performance measures and drivers corresponding to the target process with the extracted empirical processes key performance measures and drivers, and (iii) the identified and collected data corresponding to operating practices or subprocesses corresponding to the target process with the extracted empirical processes operating practices or subprocesses;
- the computer server being configured for the user to use the comparison to improve the target process outcome.

* * * * *